Figure 1:
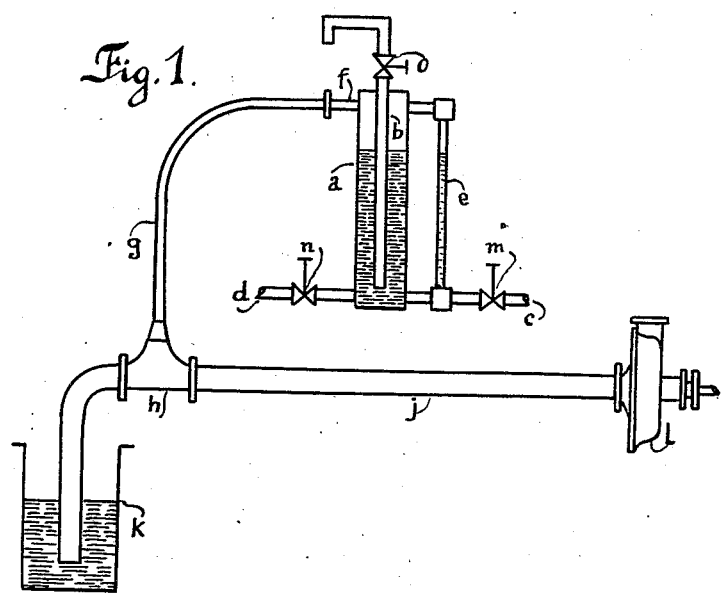

Aug. 19, 1930. A. H. WIJMANS 1,773,563
AUTOMATIC REGULATION OF CENTRIFUGAL PUMPS
Filed Feb. 6, 1929

Inventor
Albert Henricus Wijmans

Attorney

Patented Aug. 19, 1930

1,773,563

UNITED STATES PATENT OFFICE

ALBERT HENRICUS WIJMANS, OF THE HAGUE, NETHERLANDS

AUTOMATIC REGULATION OF CENTRIFUGAL PUMPS

Application filed February 6, 1929, Serial No. 337,761, and in the Netherlands February 7, 1928.

My invention relates to the control of the level in sumps and the object of the present invention is to automatically maintain a constant level in a sump within certain limits, such limits being dependent on the specific gravity of the material to be pumped.

According to this invention, there is connected with the sump a continuously operating centrifugal pump. When the liquid in the sump is at its normal level, the vacuum existing in the suction line of the pump is balanced against an external pressure transmitted to the intake pipe. A drop in the level of the sump unbalances said pressures allowing air to flow into the pump thereby reducing its capacity, until the level of the sump rises. In this manner, the level of the sump may be maintained substantially constant.

As the means for regulating the pressures are kept out of contact with the substance to be pumped, wear, choking of the pipes, corrosion, etc., will be prevented. The new arrangement, therefore, can be advantageously used for the pumping of tailings, sand, dirty water, etc., which would cause considerable wear, choking up and corrosion of pipes, fittings, etc.

Moreover, in my new arrangement a movable element is used capable of adapting itself to the direction of flow of the material so that on the flow being reversed, no choking up will occur. Said element is preferably a flexible hose made of rubber, or similar material, and which can be readily replaced when worn.

The drawing illustrates by way of example an embodiment of the invention.

Figure 2:
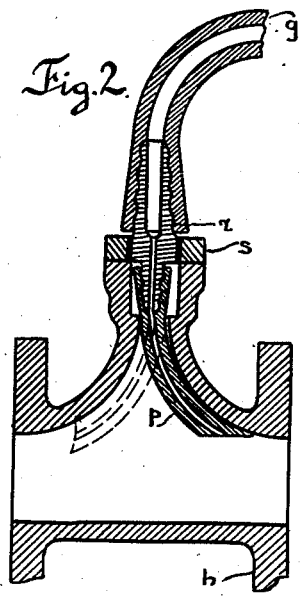
Figure 3:
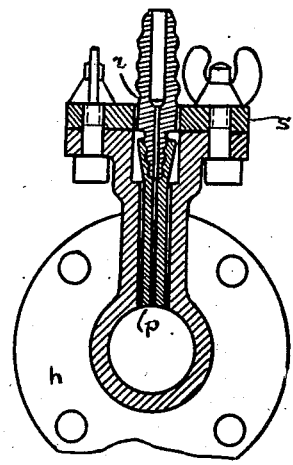

Figure 1 shows diagrammatically the whole arrangement. Figure 2 is a longitudinal section and Figure 3 a transverse section of the part comprising the movable element.

In Figure 1, $a$ is a vessel partly filled with liquid and mounted therein is a pipe $b$ with a cock $c$, said pipe being partly immersed, said parts forming a liquid seal. The vessel $a$ can be filled with liquid up to the desired level, for instance by opening a regulating cock $m$ in the pipe $c$. Through cock $n$ in pipe $d$ the liquid can be drained. A gauge $e$ indicates the liquid level. By means of a nozzle $f$ and a pipe $g$ the gas above the liquid level in vessel $a$ is in connection with a T-piece $h$ in the suction pipe $j$ of the centrifugal pump $l$. In Figure 2, said T-piece is shown in detail. It contains a rubber hose $p$, through which the gas can be injected. By its flexibility said hose tends to extend in the direction of the liquid flow in pipe $j$, so that when the pump is stopped and the contents of the delivery pipe and of the pump returns to the sump $k$, the rubber hose cannot be choked up. The rubber hose $p$ is connected with a nipple $r$, which is screwed in a flange $s$, fitted on the T-piece $h$ by bolts and wing nuts. Secured to the other end of nipple $r$ is the pipe or conduit $g$. By loosening the wing nuts the bolts can be removed and the flange $s$ with nipple $r$ can be taken away, so that hose $p$ can be readily renewed.

Only the T-piece $h$ and the injection pipe $p$ are in contact with the material to be pumped.

The operation is as follows:

When the pump is working, there will be a depression at the point of injection in T-piece $h$, which depression will be defined by the head of $h$ above the level in the sump, plus the frictional resistance of the suction pipe from $h$ to the sump, plus the frictional resistance at the mouth of the suction pipe. The air space above the liquid in the vessel $a$ will be almost under the same depression.

Owing to the inrush of air into the suction pipe $j$ and to the frictional resistance, a difference in pressure will set up between both sides of the outflow apparatus $p$, on which difference the sensitiveness of the apparatus depends.

The smaller said resistance, the more sensitive the arrangement will be. No air can enter into pipe $g$, when the reduced pressure is equal to or greater than atmospheric pressure, diminished by that of the liquid column measured from the bottom end of pipe $b$ to the liquid level in vessel $a$ and by the pressure caused by the adhesive friction. If the reduced pressure in vessel $a$ is smaller than this value, then air flows in. By regulating the liquid level in *a* the exact amount of air can be caused to enter, whereby the capacity of the pump is completely controllable and can be regulated in accordance with the average feed to the sump.

If the feed to the sump is temporarily changed, for instance, when the feed decreases, the liquid level in the sump will fall, whereby the head increases. In consequence thereof a greater difference in pressure will set up between both sides of the pipe *p*, whereby more gas flows into vessel *a* and is injected and the capacity of the pump decreases. The liquid in the sump then rises again to the desired level.

I claim:

1. In an arrangement for controlling the level of a sump, a continuously operating centrifugal pump, a suction pipe connecting said pump and the sump, an intake pipe, a T-piece disposed in said suction-pipe near the sump, a liquid seal comprising a vessel and a pipe immersed therein, a conduit leading from the gas space in said vessel to said T-piece, a movable resistance member in said T-piece, and means for regulating the liquid level in said vessel causing a definite amount of gas (air) to flow through said suction pipe to said pump upon a drop of the level of the sump, thereby reducing the capacity of said pump resulting in a rise of the level of the sump.

2. The combination as specified in claim 1, in which said movable resistance element is a flexible hose adapted to extend in the direction of the flow of liquid through said suction pipe.

3. The combination as specified in claim 1, in which said movable resistance element is a flexible hose adapted to extend in the direction of the flow of liquid through said suction pipe, including detachable means for clamping said hose in position.

In testimony whereof I affix my signature.

ALBERT HENRICUS WIJMANS.